(12) United States Patent
Young

(10) Patent No.: US 8,406,277 B2
(45) Date of Patent: Mar. 26, 2013

(54) SIGNAL PROCESSOR AND SIGNAL PROCESSING METHOD

(75) Inventor: Phil Young, Northampton (GB)

(73) Assignee: QUALCOMM Incorporated, San Diego, CA (US)

( * ) Notice: Subject to any disclaimer, the term of this patent is extended or adjusted under 35 U.S.C. 154(b) by 808 days.

(21) Appl. No.: 11/918,616

(22) PCT Filed: Dec. 8, 2006

(86) PCT No.: PCT/EP2006/069489
§ 371 (c)(1),
(2), (4) Date: Oct. 16, 2007

(87) PCT Pub. No.: WO2007/068661
PCT Pub. Date: Jun. 21, 2007

(65) Prior Publication Data
US 2009/0167594 A1 Jul. 2, 2009

(30) Foreign Application Priority Data

Dec. 16, 2005 (EP) .................................... 05112300
Dec. 21, 2005 (EP) .................................... 05112624

(51) Int. Cl.
*H04B 1/00* (2006.01)
(52) U.S. Cl. ........ 375/142; 375/140; 375/143; 375/145; 375/147; 375/149; 375/150; 342/195; 342/352; 342/357
(58) Field of Classification Search .................. 375/140, 375/142, 143, 145, 147, 149, 150, 152; 342/352, 342/357
See application file for complete search history.

(56) References Cited

U.S. PATENT DOCUMENTS

| 5,379,224 A | 1/1995 | Brown et al. |
| 5,781,156 A | 7/1998 | Krasner |
| 6,118,808 A * | 9/2000 | Tiemann et al. .............. 375/142 |
| 2009/0021428 A1 | 1/2009 | Young |

FOREIGN PATENT DOCUMENTS

| DE | 41 14 058 A1 | 11/1992 |
| EP | 1 198 068 A1 | 4/2002 |
| EP | 1198068 | 4/2002 |
| JP | 5256927 A | 10/1993 |
| JP | 2001189681 A | 7/2001 |
| WO | WO 2005/003807 A1 | 1/2005 |

OTHER PUBLICATIONS

International Search Report and Written Opinion—PCT/EP2006/069489-ISA/EPO—Mar. 28, 2007.
N Tan et al., "A Power-Saving Technique for Bit-Serial DSP ASICs,", ISCAS '94 IEEE International Symposium on Circuits and Systems, vol. 4, May 30, 1994, pp. 51-54.

* cited by examiner

Primary Examiner — Leon Flores
(74) Attorney, Agent, or Firm — Howard Seo

(57) ABSTRACT

Radiolocalization receiver for a satellite radiolocalization system like GPs, Galileo or the like, including a staged correlation and accumulation unit, in which the correlation data is biased in order to be to always non-negative. Thanks to this feature, the accumulated data grow monotonically during the accumulation. Overflow rate of a first correlation stage (100, 150-153) is scaled down respect to the rate of the input data. Thus the higher correlation stages (200, 154-158) can be used in multiplex. The bit-flip rate in memories is very low, with an effective reduction of dynamic power consumption. The logic structure of the accumulator is also simplified by the invention, thus further savings in silicon space and power are possible.

13 Claims, 4 Drawing Sheets

SIGNAL PROCESSOR AND SIGNAL PROCESSING METHOD

REFERENCE DATA

This application is a national stage of PCT/EP2006/069489, filed Dec. 8, 2006, which claims priority of European patent applications EP05112300, filed Dec. 16, 2005, and EP05112624, filed Dec. 21, 2005, the contents of both of which are hereby incorporated by reference.

FIELD OF THE INVENTION

The present invention concerns a satellite radiolocalization receiver and in particular, but not exclusively, a radiolocalization receiver adapted to receive and process radiolocalization signals generated by a constellation of geo-localization satellite, like for example the satellites of the GPS, GLONASS or Galileo System or other global navigation satellite systems (GNSS). The present invention also concerns a signal processor unit adapted for treating radiolocalization signals provided by a suitable RF interface, and which can be embedded in a dedicated GNSS apparatus or in another host system, like for example a general-purpose computer, PDA or cell phone.

DESCRIPTION OF RELATED ART

The Global Navigation Satellite Systems (GNSS) generically include the Global Positioning System (GPS), operated by the United States, the Global Orbiting Navigation Satellite System (GLONASS) operated by the Russian Federation and the projected Galileo positioning system, to be built by the European Union.

The following description and examples will often refer, for the sake of simplicity, to a GPS receiver only. It will be understood, however, that the present invention is not necessarily restricted to such a receiver, but includes also all GNSS sources, and can be extended to other future radiolocalization systems to which the invention is applicable.

GNSS radio signals are located in the portion of the radio spectrum above 1 GHz, have power level, at ground, of the order of −120 dBmW or less and are generally direct-sequence spread-spectrum signals modulated by pseudo-random code binary sequences, which are used in the receiver for positioning and navigation. The general functioning of a satellite radiolocalization devices are well known and will be resumed briefly in the description. Reference is also made to patent applications EP 1198068 and WO05003807 in the name of the applicant.

Satellite radiolocalization systems, such as GPS (Global Positioning System), GLONASS or Galileo rely on the reception of radio signals broadcast from a number of orbiting satellites and use the information contained in these signals to determine the distances, or ranges, from the receiver to each of the received satellites. The orbits of the satellites being known, absolute time and the location of the GPS receiver can then be determined geometrically.

In the context of the present invention the terms "receiver" and "GPS receiver" can designate a complete self-contained receiver device, but also a module, included in a complex entity, for example a GPS module in a cellular phone, a car alarm, a PDA (Portable Digital Assistant) and so forth. The terms above may also indicate a pluggable module, which may be connected with a hosting device by means of an appropriate bus, for example a GPS PC-card.

The terms "receiver" and "GPS receiver" should also be understood, in the context of the present invention, as including one of more integrated circuits, arranged to realize a complete GPS receiver or a complete GPS module, as defined above.

The following description relates mostly to the GPS Global Positioning System. The invention is not however limited to this particular system but can also be employed in receivers for radiolocalization systems based on the same principles, for example the GLONASS system or the GALILEO system.

In the case of the original GPS radiolocalization system, each of the operational GPS satellites, also indicated as Space Vehicle or SV, transmits a navigational radio signal at two carrier frequencies, referenced as "L1" and "L2" and situated at 1572.42 MHz and 1227.60 MHz respectively. The L1 and L2 carriers are modulated by two digital ranging code sequences, called the C/A (coarse acquisition) code and the P(Y) code, the latter being mostly restricted to the US government and military.

The C/A code, which is used by commercial GPS receiver, is modulated in the L1 and in the L2 carriers. C/A codes, which are unique for each GPS satellite, are pseudo-random Gold codes comprising a repetition of a 1023 bits, or "chips", with a transition rate of 1.023 MHz, and are often indicated in short as PRN. The C/A code thus repeats itself every millisecond. The ranging code sequences are synchronized to a common precise time reference, the "GPS time" which is held by precise clocks on board of each satellite, and which are synchronized to a master clock. The effect of the PSK modulation with the C/A code is to spread the spectrum of the modulated signal over a 1 MHz bandwidth.

Other radiolocalization systems, for example the proposed Galileo system and proposed extensions to the GPS system, also employ similar or equivalent signal structures, based on ranging codes synchronized to a common standard of absolute time.

Both L1 and L2 carriers further carry a 50 bps navigation message, the NAV code. The navigation message contains, along with other information, the coordinates of the GPS satellites as a function of time, clock corrections, and atmospheric data. The NAV message is encoded by inverting the logical value of the C/A code whenever the NAV bit is "1", and leaving it unaltered otherwise.

The signal strength of the GPS signals on earth surface is, nominally, −130 dBmW, a value which is further attenuated whenever the view of the sky is obstructed, and especially within buildings. Other satellite navigation systems provide signals of comparable strength. Such levels are well below the noise floor, thus the signal can be received only by use of statistical techniques.

In order to acquire these codes and perform a position fix a GPS receiver generates, for each received satellite, a local replica of the C/A code, the PRN code, adjusted to a local NCO running at a frequency close to 1.023 MHz. The code is then time-shifted, correlated with the received signal in a correlation engine of the receiver, and integrated, for a time that can be more or less long according to the noise level, until a peak of correlation value is obtained for a certain value of time-shift, that depends from the distance between the receiver and the satellite.

The amount of time-shift needed to achieve optimal correlation, or pseudo-range, is an indication of the distance between the satellite and the GPS receiver. The internal clock of the GPS is usually affected by a large error with respect to the GPS satellite clocks. In order to resolve this error a GPS receiver must acquire at least four satellites to provide a position fix comprising the three space coordinates x, y, z and time t.

The phase in which the GPS receiver endeavors to localize a sufficient number of satellite signals in the phase offset—Doppler shift space with little or no knowledge of their position is usually named the "acquisition" state. Once the peaks are found, on the other hand, in the "tracking" state, the system has only to follow their drift, which is usually done with less difficulty or delay.

In order to speed up the acquisition state, many receivers adopt a massively parallel architecture, in which the correlation engine of the receiver comprises a large number of correlators, in order to explore several combinations of time shift and Doppler frequency in parallel. In typical cases, a correlation engine is able to perform correlation of the incoming signal with thousands of code phase-shift/Doppler frequency combinations.

A limitation of this approach is that each of the independent correlators requires an independent integration register, which has to be updated at high speed during the acquisition phase. Typically the correlation registers are implemented by register cells which contribute heavily both to the size of the resulting circuit, for example in terms of silicon area used, and to the power consumption.

BRIEF SUMMARY OF THE INVENTION

According to the invention, these aims are achieved by means of the object of the appended claims.

The invention will be better understood with the aid of the description of an embodiment given by way of example and illustrated by the figures, in which.

Figure 4:
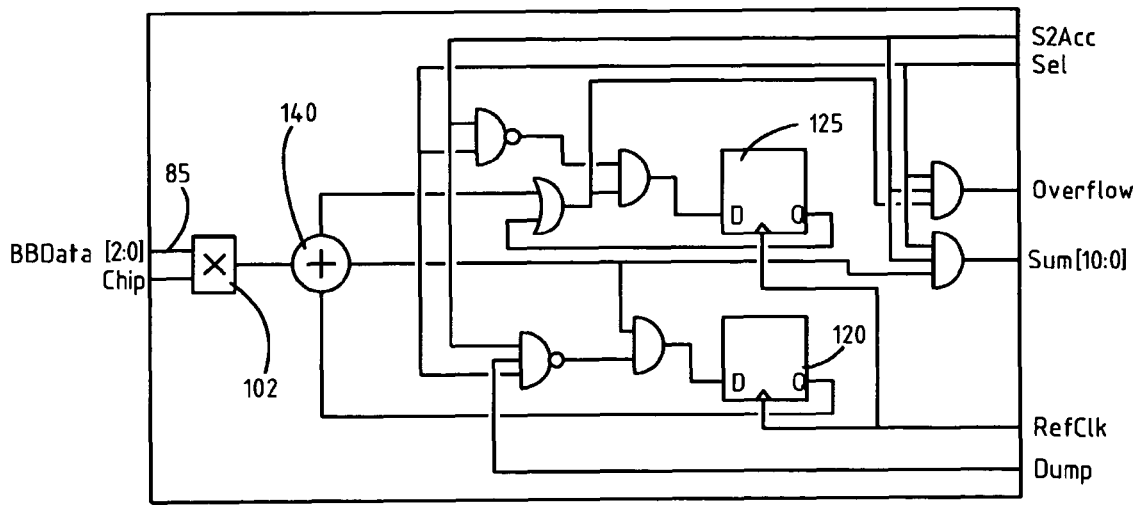
Figure 5:
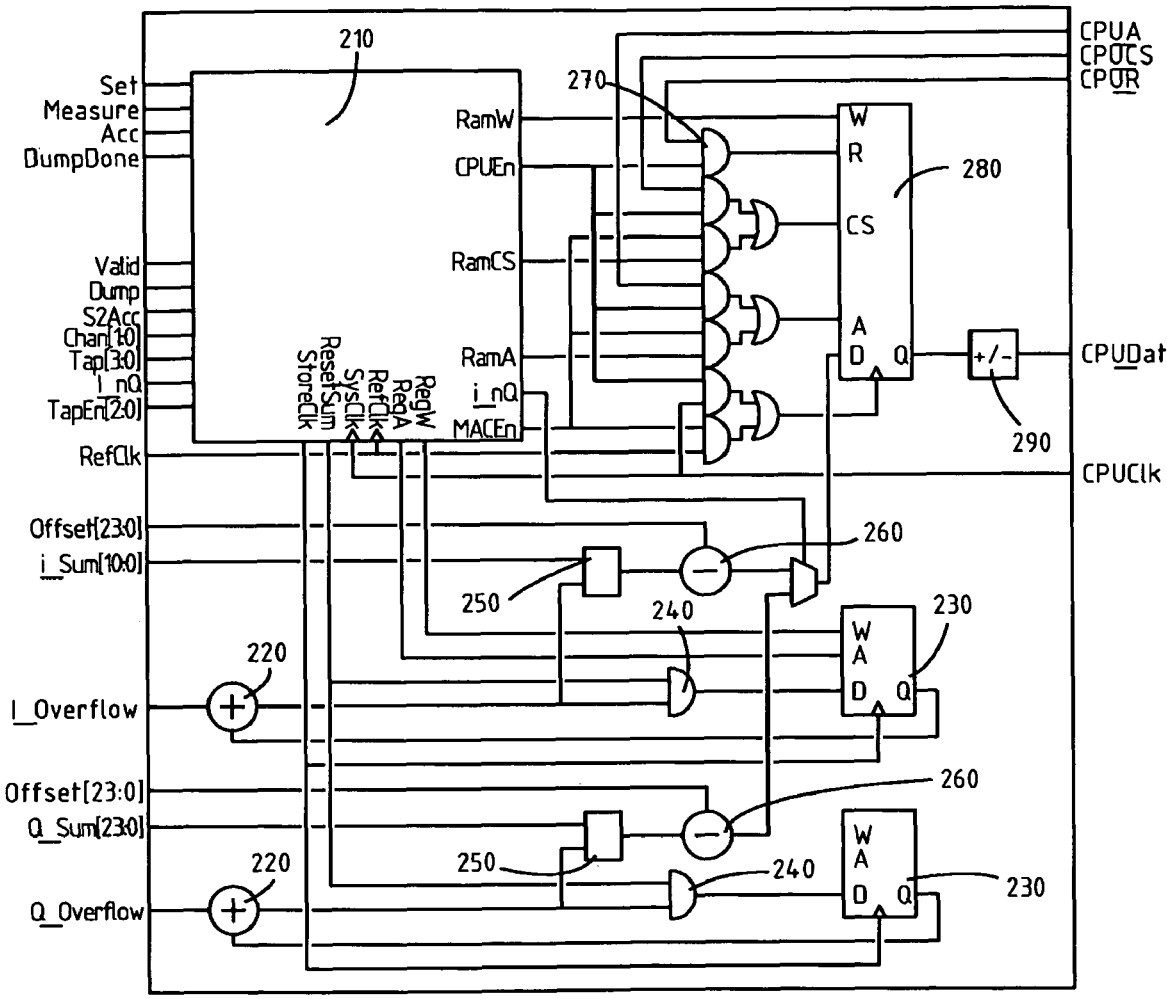
Figure 6:
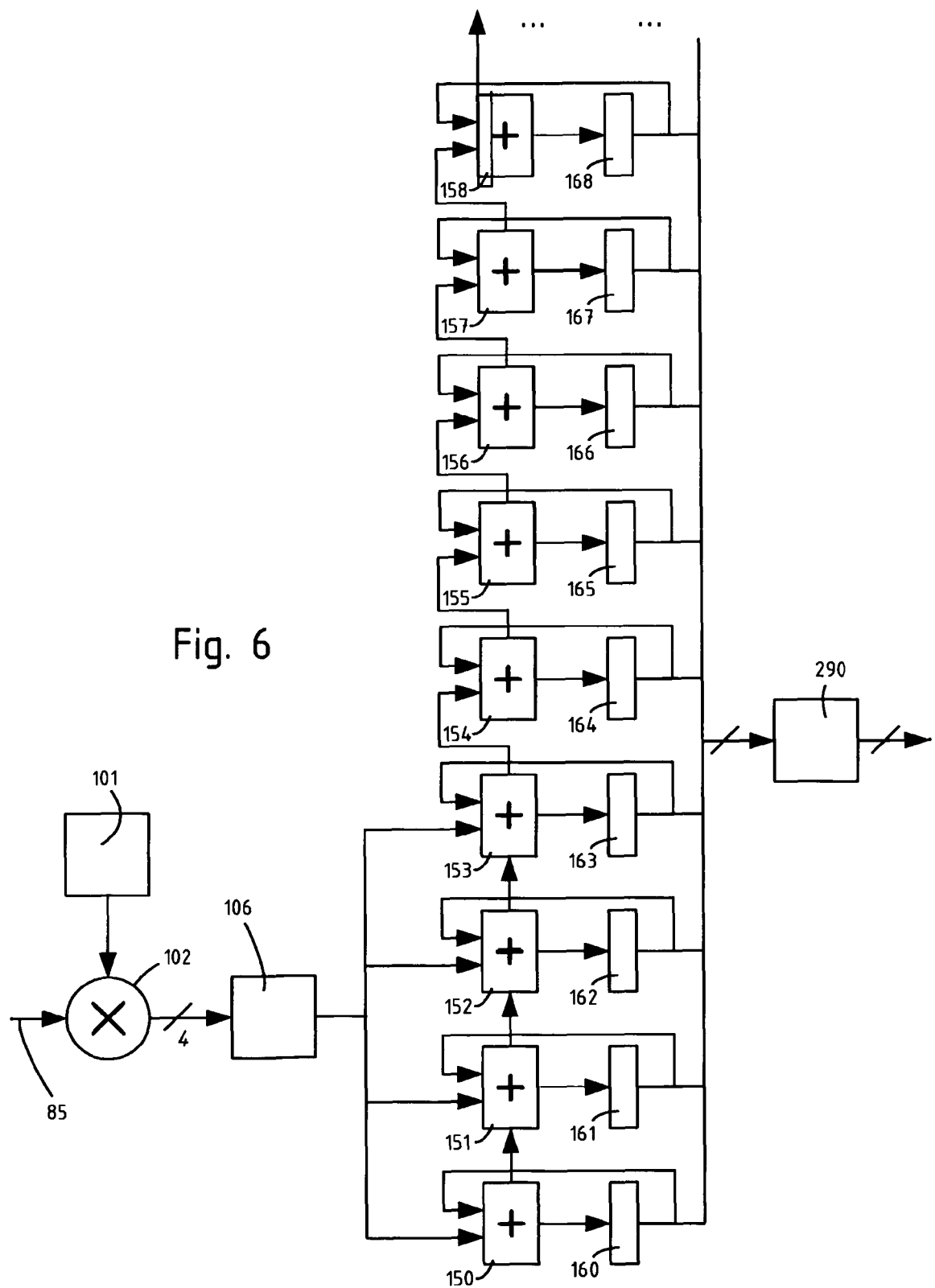

FIGS. 4 and 5 respectively show a first and a second correlation and accumulation stage according to one aspect of the present invention FIG. 6 illustrates a variant of execution of a correlation and accumulation stage according to one aspect of the present invention.

DETAILED DESCRIPTION OF POSSIBLE EMBODIMENTS OF THE INVENTION

Figure 1:
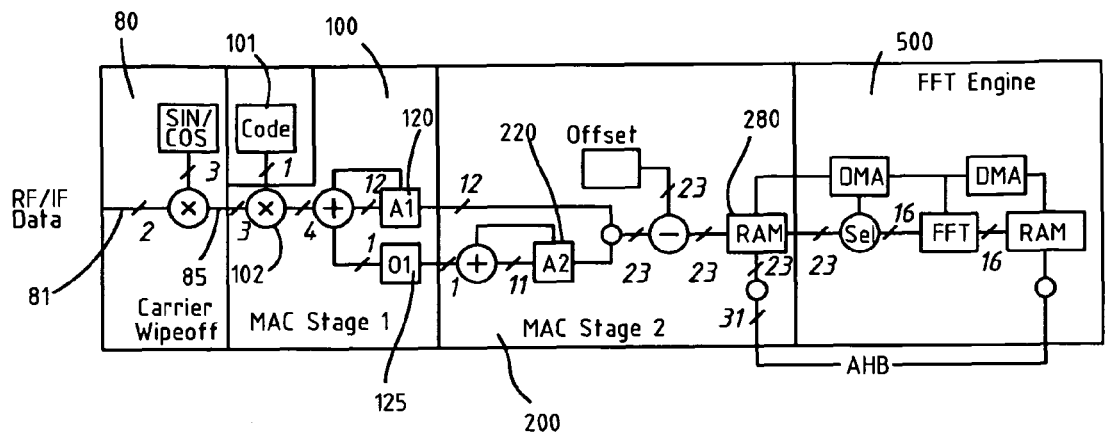
FIGS. 1 and 3 Show schematically the architecture of a correlation engine according to one aspect of the present invention.

FIG. 1 represents schematically a simplified data pipeline in a digital receiving channel, or tap, of a radiolocalization receiver according to some aspects of the present invention. Italic numbers, in FIG. 1, indicate bit width of the data lines they refer to. Such data widths are given here by way of example only, in order to assist understanding, and do not limit the invention in any way.

The receiver 50 comprise preferably a carrier wipeoff section 80, which shall be described later in further detail, whose task is to remove a carrier signal from the digital RF or IF data 81, for example a digital IF (Intermediate Frequency) signal provided from a RF section (not represented) of the receiver. The carrier wipeoff section comprises a local carrier generator 82, for example an NCO, which is arranged to generate a replica carrier signal equal to the carrier of the RF or IF Data, including carrier Doppler, which is mixed with the input RF data to produce a carrier-stripped digital signal 85, having, for example, three bits. Even if not immediately apparent from FIG. 1, the carrier wipeoff section 80 produces both an in-phase (I) and a quadraphase (Q) digital signal 85, by mixing two quadrature-shifted (SIN/COS) copies of the local carrier with the RF/IF data.

In the represented example, the carrier NCO provides a 2 bit sine/cosine output with values mapped in a three-bit representation as in the following table 2. Other representation are however possible and included in the scope of the present invention.

TABLE 1

| SIN/COS mapping | | | | | | | | |
|---|---|---|---|---|---|---|---|---|
| Phase | 0 | 45 | 90 | 135 | 180 | 225 | 270 | 315 |
| COS | 2 | 2 | 1 | −1 | −2 | −2 | −1 | 1 |
| SIN | −1 | 1 | 2 | 2 | 1 | −1 | −2 | −2 |

The RF or IF data 81 have 2 bits sign/magnitude interpreted according to the following table 3.

TABLE 2

| IF Input mapping | | |
|---|---|---|
| IF Value | Sign | Magnitude |
| 3 | 0 | 0 |
| 1 | 0 | 1 |
| −1 | 1 | 0 |
| −3 | 1 | 1 |

The carrier-stripped data 85 resulting of the multiplication is mapped into 3 data bits as shown to reduce logic in later stages.

TABLE 3

| dot product mapping | |
|---|---|
| Value | Representation |
| −6 | 0 |
| −3 | 1 |
| −2 | 2 |
| −1 | 3 |
| 1 | 4 |
| 2 | 5 |
| 3 | 6 |
| 6 | 7 |

The digital signal 85 is still mixed with all of the in-view satellite signals. The local code generator 101 is arranged to generate a local replica of the PRN code of one specific satellite, in order to obtain a baseband code-stripped signal for that satellite. The replica PRN code has for example a single bit per tap, representing −1(0) and +1(1). As it will be seen later the multiplier 102 biases the results so they are positive. This simplifies the rest of the accumulator and reduces the power consumption.

To reduce the resources required for implementing the large number of correlator taps the MAC (multiply/Accumulate) is partitioned into 2 or more stages, the first stage 100, or MAC stage 1, operates preferably on all taps simultaneously within a single clock cycle producing a partial result which is always positive.

According to one aspect of the invention, the digital data that are to be accumulated in the correlation engine are biased so that they are always positive integers, or at least non-negative integers. This can be obtained, for example, by adapting the multiplier stage 102. In the represented example, the code value can be either 0 or 1, while the value of carrier-stripped data 85 can be ±1, ±2, ±3, or ±6. Table 4 below indicates the effect of multiplying the code and adding a bias.

TABLE 4 code dot product offset mapping

| Code value | Data value | Data representation | Result | Biased result |
|---|---|---|---|---|
| 0 | −6 | 0 | 6 | 12 |
| 0 | −3 | 1 | 3 | 9 |
| 0 | −2 | 2 | 2 | 8 |
| 0 | −1 | 3 | 1 | 7 |
| 0 | 1 | 4 | −1 | 5 |
| 0 | 2 | 5 | −2 | 4 |
| 0 | 3 | 6 | −3 | 3 |
| 0 | 6 | 7 | −6 | 0 |
| 1 | −6 | 0 | −6 | 0 |
| 1 | −3 | 1 | −3 | 3 |
| 1 | −2 | 2 | −2 | 4 |
| 1 | −1 | 3 | −1 | 5 |
| 1 | 1 | 4 | 1 | 7 |
| 1 | 2 | 5 | 2 | 8 |
| 1 | 3 | 6 | 3 | 9 |
| 1 | 6 | 7 | 6 | 12 |

The MAC is disabled when a code slew is activated and is re-enabled after the next ACC event, this prevents erroneous correlator outputs being propagated to the CPU.

Each tap of the replica code is multiplied by the baseband signal on each cycle and accumulated into a holding register 120, 125, 220, in the MAC stages 100 and 200. These registers are sized to allow accumulation of a number of data samples without overflowing on a section of code referred to as a code segment.

The second stage 200 then accumulates, for example, the overflow from these partial accumulations into a RAM 280 for more efficient storage, this is done sequentially over a number of channels.

The signal processing unit engine 500 performs further processing on the data stored RAM 280, for example by FFT processing or other means.

Figure 2:
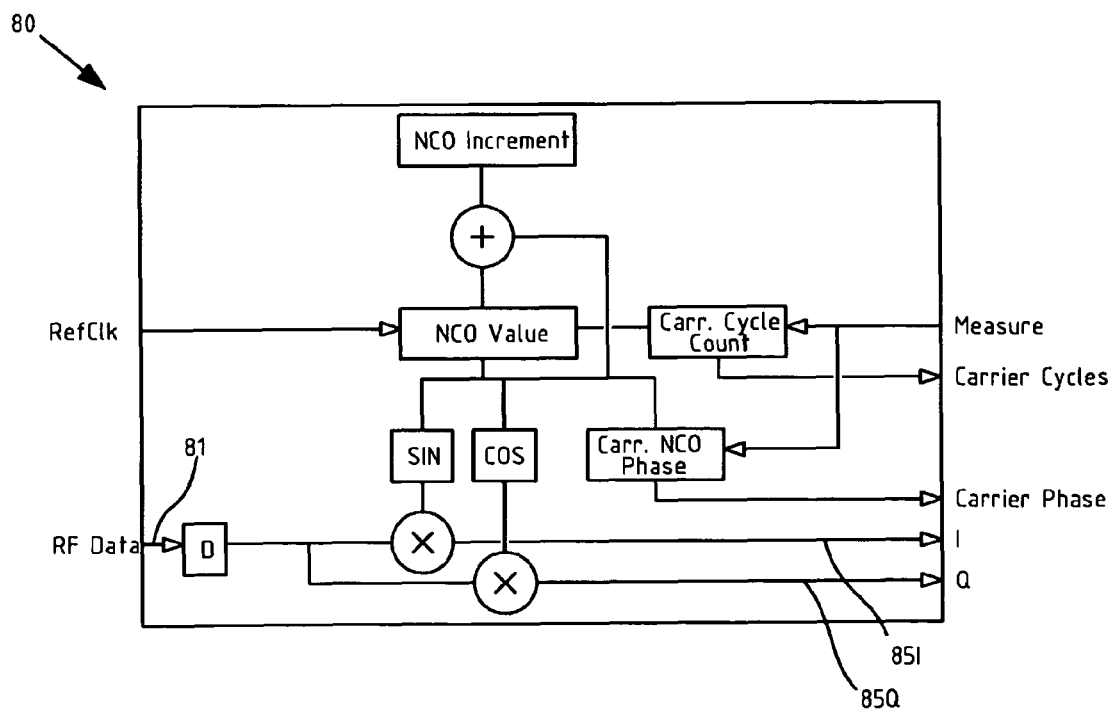
FIG. 2 shows a carrier wipeoff section of a receiver according to the present invention.

FIG. 2 represents in further detail the structure of the carrier wipeoff section 80. According to this figure RefClck is a Reference clock signal, Measure is an input signal indicating that a measure is performed, CarrierCycle and CarrierPhase are digital signals which are available to other stages of the receiver, for various purposes. 85I and 85Q indicate the in-phase and quadraphase output digital signals.

Figure 3:
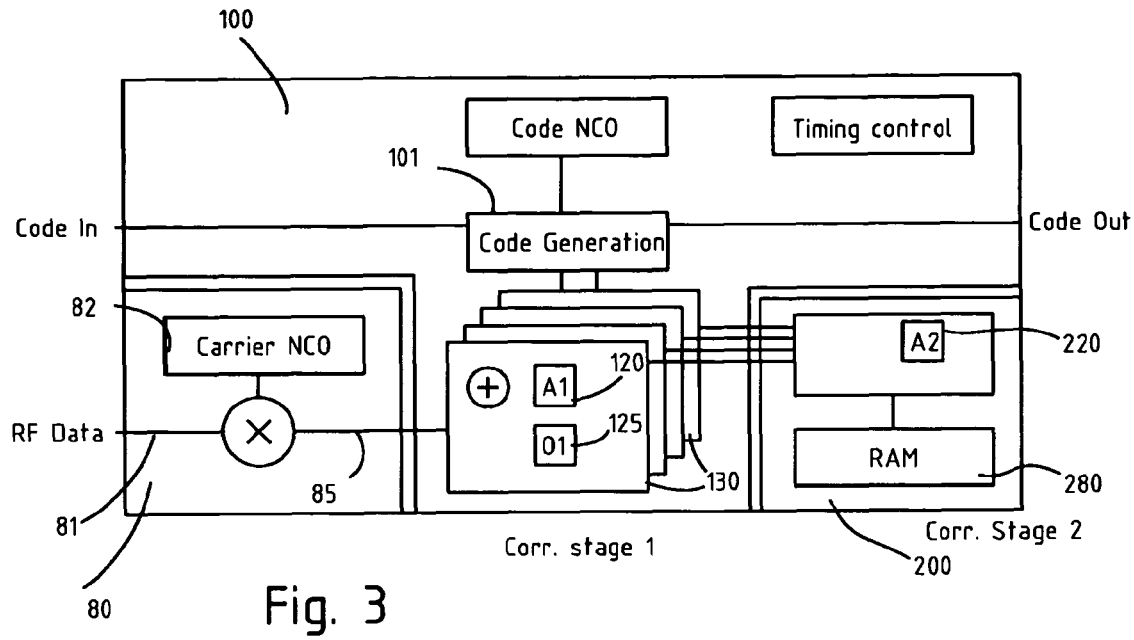

FIG. 3 represents the architecture of the correlation engine section in further detail. The carrier-stripped signal 85, is correlated with the codes generated by code generator 101 and the code-stripped signal so obtained is accumulated in correlation stages 1 and 2. In first correlation stage 100 all taps are accumulated in parallel by a plurality of accumulation cells 130. For example the stage1 accumulator is duplicated 32 times with the appropriate I/Q data and code phases routed accordingly.

FIG. 4 shows a possible realization of an accumulation cell 130 according to one aspect of the invention. Incoming data 85 is multiplied in the multiplier 102 by the gold code (Chip) generated by the code generator 101 (see FIG. 1) and the resulting code-stripped value is encoded or biased to give a positive value on each cycle, for example according to table 4. The biasing circuit is not represented for sake of simplicity. According to the invention it can be a separate circuit from multiplier 102, or integrated in the multiplier 102. The biased result is added by adder 140 to the value stored in the holding register 120 and any overflow is used to set the overflow register 125. Even if FIG. 4 shows a one-bit register 120 for simplicity, the capacity of the holding register 120 may be chosen according to the circumstances. For example the holding register 120 may be a 12-bit register. In this case the adder 140 would be a 12-bit full adder, and the overflow register 125 a simple register, to store the carry bit of the adder 140.

Importantly, the encoding used is such that it can be readily reversed. This is trivial in the case of a fixed biasing, that can be simply subtracted from the accumulated data, when needed. Other encodings are however possible within the invention.

When the second correlation section 200 is reading a value by asserting Sel and S2Acc the overflow flag is reset, but the accumulated value is not reset.

When a dump cycle is occurring, Dump is activated at the same time, and this causes the accumulated value to also be reset, at this time the value that was in it is transferred to the output memory by the second correlation stage 200.

According to a possible embodiment of the invention the second stage of correlation 200 shown in FIG. 5, is performed using a register file 230 and state machine 210 where the register file 230 is shared between multiple taps and possibly multiple channels for better efficiency. This state machine 210 addresses the memory periodically to read the value corresponding to a tap then adds the overflow of the first correlation stage 100 into the second correlation stage 200.

When a dump event is triggered the storage is reset instead of accumulated and the accumulated value output is stored in any appropriate way, for example it is pushed into a FIFO together with an address corresponding to the channel being dumped.

The correlation stage 200 operates sequentially over a number of accumulators 130 belonging to one or more first correlation stage units 100. There are 3 basic operations described below.

Each operation is triggered by activation of the Stage2Start event from the Timing Control module.

In each mode the state machine performs an identical operation on each of the input channels in sequence then enters the idle state again.

For each correlator tap there are 2 channels, I and Q to be processed. The second correlation stage 200, for example, has to accumulate for up to 10 ms without rollover, using samples at up to 32 MHz, this equates to 320000 samples*12=3,840,000, this requires 22 bits of data to store the result.

Since in this example the first correlation stage 100 has 12 bits, of which the MSB, or carry bit stored in the overflow register 125 is accumulated into the register file 230 we need to accumulate 11 bits per value, this implies the use of an 11*128 register file.

Alternatively, by accessing I and Q in a single cycle one could use a 64 word register file, in this case we update at twice the rate, performing 64 taps in 16 cycles. This reduces the range required in stage 1 to 11 bits and increases correspondingly the width of the state2 register file to 22 bits.

Periodically the master timing controller of the second correlation stage 200 activates the Acc signal to cause an accumulation of all the MAC Stage1 result, this triggers the state machine 210 to begin an accumulate process. Data from the MACs are addresses with Chan[1:0], Tap[3:0] and I_nQ signals.

Data is accessed by assertion of the S2Acc signal, accumulated values are read from the register file 230 and added, by adders 220 to the overflow bit from the addressed accumulator 130. The results are written back to the register file.

When the timing master indicates that a dump cycle is to be performed the same sequence of events begins, with the same timing, however this time the state machine asserts the Dump indication to the stage1, this causes each accumulator 130 in stage1 to restart accumulation.

During a dump event the data from the registers is added to the overflow flag from the addressed tap and concatenated with the lower 11 bits from stage 1, in unit 250. The resulting unsigned value has a fixed offset and this is removed in the subtractor 260, the result is then stored into the magnitude ram 280. During the dump cycle the contents of the register file are zero'ed ready for the next accumulate cycle To access the magnitude ram the state machine uses the multiplexor 270 to take control of the clock and control lines so that the memory is accessed on the RefClk domain, when not required for dump events the memory is connected to the CPU domain.

The results in the magnitude ram 280 are signed 22 bit values, so to reduce the memory overhead the result is sign extended to 32 bits by unit 290 when the CPU reads it.

The presented architecture depends on the fact that the input data 85 are biased after multiplication by the CA Code so as to be always positive, or always non-negative. In this way, the first correlation stage 100 stores a first group of lower-order bits of the integrated correlation value that always grows monotonically, increasing, and never decreasing, during an accumulation. The second correlation stage 200 just has to accumulate, in a second group of higher-order bits of the same variable, the value of the overflow, or carry bit, of the first correlation stage 100 (a fully equivalent result could be obtained by biasing the input data with a negative bias, so they are always non-positive). The advantages of this are several:

The overflow rate of the first correlation stage 100 is conveniently scaled down with respect to the rate of the input data. Thus the second correlation stage 200 can interface several accumulators 130 or several first stages 120, accumulating only the carry output of the previous stages on each iteration, effectively realizing a multiplexing of the data in the time domain.

Full speed random access is not needed in the second correlation stage 200. Register files and RAM can be used, instead of static registers, with a gain in power and silicon efficiency.

The adders 220 in the second correlation stage 200 can be simply implemented as half adders.

Since the storage areas 120, in the first correlation stage 100, and 230, in the second correlation stage 200, are incremented by small positive numbers, the transition frequency of the individual bits decreases logarithmically, going from the lower to the higher bit weights. That is, most of the time, the binary values read form the memory 120 are written back unchanged.

This means that the bit-flip rate in memories 120 and 230 is very low, with a very substantial reduction of dynamic power consumption.

The last advantage is especially evident in comparison with the traditional accumulation modules, in which data are stored as signed integers, for example as 2-complement binary values, and incremented randomly, at each cycle, by positive or negative values. In this situation, every time the random accumulation leads to a change of sign in the result, most of the bits switch at the same time, drawing a large dynamic current.

The use of non-negative values in correlation stages 100 and 200 also allows a simpler logical structure, thus a reduced silicon area and, as a consequence a better routing. Timing needs are also more relaxed in the correlation units of the invention, than in conventional correlators using signed integers. Besides being advantageous in themselves, these features further contribute to power saving. Circuit simulations indicate an energy saving better than 30% in correlation stages 100 and 200 by using non-negative values.

FIG. 6 represents another embodiment of a correlation stage according to the present invention, in which each tap is independently accumulated in a chain of registers. Digital carrier-stripped signal 85, is presented to multiplier 102 for correlation with the local code replica provided by code generator 101, as in the previous example. The bias unit 106 adds a predefined bias to the output of the multiplier, in order to obtain digital values that are always positive, or always non-negative, for example 4-bit non-negative values as presented in table 4 above.

The 4-bit positive values are repeatedly integrated in the accumulator constituted by adders 150-158 and registers 160-168. Clearly, even if the presented example concerns a 9-bit accumulator, the bit depth of the accumulator could be extended or varied at will. Also, the ripple-type configuration shown here could be replaced by other adder circuits, of known type. The subtractor 290 removes the accumulated bias and provides an unbiased integrated correlation value at the output.

Importantly, while the first group of four accumulator cells, composed by adders 150-153 and registers 160-163 constitute a four-bit full adder, the group composed by the other cells only accumulate the overflows of the first four, because the correlated data are biased to be always positive. Thus cells 154,164; 155, 165; 156, 166 and so on are, effectively, just a counter, and the elements 154-158 can be simple half-adders.

The average rate of transition halves at each step in registers 164-168. The upper cells, composed by registers 164-168 and half-adders 154-158, change state very seldom and consume little power.

The invention claimed is:

1. An apparatus comprising:
a correlation unit to correlate a signal associated with a radiolocalization system with a plurality of replica codes and provide an output signal comprising a code-stripped signal, each replica code having a determined code shift and a determined frequency;
an integration unit to accumulate data from a biased output signal in a plurality of correlation taps, at least one correlation tap corresponding to a determined replica code having a determined combination of code shift and frequency of the replica code, the integration unit comprising a first stage with one or more accumulation units, at least one accumulation unit being programmable to accumulate correlation data relative to a correlation tap, and a second stage programmable to accumulate data from one or more of the one or more accumulation units; and
an encoding unit to encode the code-stripped signal in a sequence of numbers that are either non-negative or non-positive to provide the biased output signal.

2. The apparatus according to claim 1, wherein the encoding unit adds a fixed bias to the code-stripped data.

3. The apparatus according to claim 1, further comprising a subtractor stage to remove a bias from the accumulated data.

4. The apparatus according to claim 1, wherein at least one of the correlation unit, the integration unit, or the encoding unit is provided, at least in part, by a signal processor.

5. The apparatus according to claim 1, the second stage to count overflows of the one or more accumulation units.

6. The apparatus according to claim 1, wherein the second stage comprises at least one of: a RAM or a register file.

7. The apparatus according to claim 1, wherein at least one of the one or more accumulation units comprises at least one full adder to accumulate a group of lower-order bits, or at least one half adder to accumulate a group of higher-order bits.

8. The apparatus according to claim 1, further comprising a carrier wipeoff unit to affect the signal associated with the radiolocalization system.

9. The apparatus according to claim 1, further comprising a receiver for obtaining the signal associated with the radiolocalization system.

10. A method of signal processing comprising:
    digitizing and removing a carrier from a signal to provide a carrier-stripped digital signal;
    correlating the carrier-stripped digital signal with a plurality of replica codes, at least one replica code having a determined code shift and a determined frequency, to provide a code-stripped signal;
    accumulating data, in a plurality of sections, based on a biased output signal for a plurality of correlation taps, wherein at least one of the plurality of sections is time multiplexed to separately accumulate a carry output of a first previous section and a carry output of a second previous section, at least one correlation tap corresponding to a determined replica code having a determined combination of code shift and frequency of the replica code; and
    encoding the code-stripped signal to provide a sequence of numbers that are either non-negative or non-positive and provide the biased output signal.

11. The method according to claim 10, wherein the encoding comprises adding a fixed bias to the code-stripped signal.

12. The method according to claim 10, wherein with the at least one of the plurality of sections, only carry outputs of the first and second previous sections are accumulated.

13. An apparatus for use in processing signals, the apparatus comprising:
    means for correlating a carrier-stripped digital signal with a plurality of replica codes, at least one replica code having a determined code shift and a determined frequency, to provide a code-stripped signal;
    means for accumulating data, in a plurality of sections, based on a biased output signal for a plurality of correlation taps, wherein at least one of the plurality of sections is time multiplexed to separately accumulate a carry output of a first previous section and a carry output of a second previous section, at least one correlation tap corresponding to a determined replica code having a determined combination of code shift and frequency of the replica code; and
    means for encoding the code-stripped signal to provide a sequence of numbers that are either non-negative or non-positive and provide the biased output signal.

* * * * *